US008917204B2

(12) United States Patent
Trotta et al.

(10) Patent No.: US 8,917,204 B2
(45) Date of Patent: Dec. 23, 2014

(54) INTEGRATED CIRCUIT, TRANSCEIVER AND METHOD FOR LEAKAGE CANCELLATION IN A RECEIVE PATH

(75) Inventors: Saverio Trotta, Munich (DE); Bernhard Dehlink, Unterhaching (DE); Ralf Reuter, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 514 days.

(21) Appl. No.: 13/382,789

(22) PCT Filed: Jul. 16, 2009

(86) PCT No.: PCT/IB2009/053082
§ 371 (c)(1),
(2), (4) Date: Jan. 6, 2012

(87) PCT Pub. No.: WO2011/007199
PCT Pub. Date: Jan. 20, 2011

(65) Prior Publication Data
US 2012/0112956 A1    May 10, 2012

(51) Int. Cl.
*G01S 13/00*    (2006.01)
*G01S 13/52*    (2006.01)
*H04B 1/52*    (2006.01)
*G01S 7/02*    (2006.01)

(52) U.S. Cl.
CPC .............. *H04B 1/525* (2013.01); *G01S 7/023* (2013.01)
USPC ............................ 342/159; 342/165; 342/173

(58) Field of Classification Search
CPC ....... G01S 5/021; G01S 5/0252; G01S 7/023; G01S 7/40–7/4056
USPC ................................................. 342/159–174
See application file for complete search history.

(56) References Cited

U.S. PATENT DOCUMENTS

| 4,725,842 | A | * | 2/1988 | Mayberry | ..................... 342/198 |
| 4,968,967 | A |   | 11/1990 | Stove |   |

(Continued)

FOREIGN PATENT DOCUMENTS

DE    102007046566 A1    5/2008
JP    2008-005448    1/2008

OTHER PUBLICATIONS

Forstner Hans-Peter et al: "A 77GHz 4-Channel Automotive Radar Transceiver in SiGe" 2008 IEEE Radio Frequency Integrated Circuits Symposium, RMO3C-3, 2008 IEEE, pp. 233-236.

(Continued)

*Primary Examiner* — Peter Bythrow

(57) ABSTRACT

An integrated circuit for cancelling a radio frequency transmit leakage signal comprises: a transmitter portion comprising at least one amplifier stage for transmitting a radio frequency signal to an antenna port; and a first coupler arranged to operably couple the transmitter portion, the antenna port and a receiver portion. The receiver portion is arranged to receive a first composite signal that comprises a received radio frequency signal from the antenna port and the transmit leakage signal. The receiver portion comprises: a first down-conversion circuit arranged to receive the first composite signal and a local oscillator signal such that the first down-conversion circuit outputs a down-converted composite signal at a first intermediate frequency signal; and a second coupler arranged to receive the down-converted first composite signal at the first intermediate frequency signal and a phase shifted version of the local oscillator signal such that the phase shifted version of the local oscillator signal is arranged to cancel at least a portion of the transmit leakage signal from the down-converted first composite signal.

17 Claims, 4 Drawing Sheets

(56) References Cited

U.S. PATENT DOCUMENTS

| | | | |
|---|---|---|---|
| 4,970,519 A * | 11/1990 | Minnis et al. | 342/165 |
| 5,444,864 A * | 8/1995 | Smith | 455/84 |
| 6,169,912 B1 | 1/2001 | Zuckerman | |
| 6,567,648 B1 * | 5/2003 | Ahn et al. | 455/83 |
| 7,072,614 B1 * | 7/2006 | Kasperkovitz | 455/24 |
| 7,202,812 B2 * | 4/2007 | Krikorian et al. | 342/198 |
| 7,576,683 B2 * | 8/2009 | Thomas et al. | 342/120 |
| 7,576,687 B2 * | 8/2009 | Forstner | 342/175 |
| 2002/0072344 A1 * | 6/2002 | Souissi | 455/296 |
| 2005/0107051 A1 * | 5/2005 | Aparin et al. | 455/126 |
| 2005/0207509 A1 * | 9/2005 | Saunders et al. | 375/285 |
| 2006/0098765 A1 * | 5/2006 | Thomas et al. | 375/346 |
| 2006/0273952 A1 * | 12/2006 | Krikorian et al. | 342/198 |
| 2007/0117528 A1 * | 5/2007 | Kwon et al. | 455/296 |
| 2009/0102706 A1 | 4/2009 | Goldblatt et al. | |
| 2009/0213770 A1 * | 8/2009 | Mu | 370/281 |

OTHER PUBLICATIONS

International Search Report and Written Opinion correlating to PCT/IB2009/053082 dated Apr. 12, 2010.

* cited by examiner

FIG. 1 - Prior Art

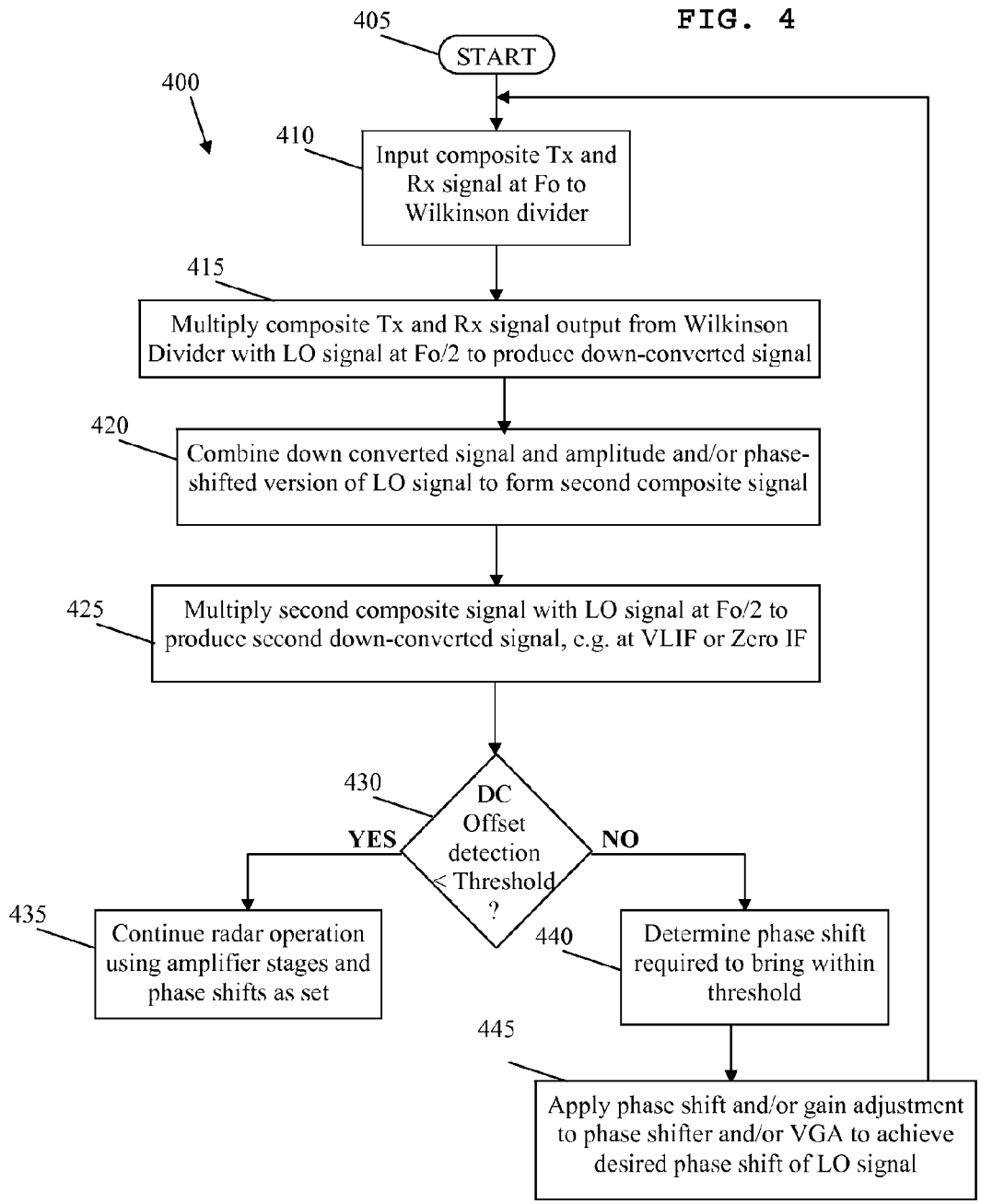

INTEGRATED CIRCUIT, TRANSCEIVER AND METHOD FOR LEAKAGE CANCELLATION IN A RECEIVE PATH

FIELD OF THE INVENTION

The field of this invention relates to an integrated circuit, a transceiver and a method for transmit leakage cancellation of signals in a high frequency transceiver. The field of the invention is applicable to, but not limited to, an integrated circuit for a high frequency transceiver that is suitable for use in a mono-static radar system.

BACKGROUND OF THE INVENTION

RAdio Detection And Ranging, often referred to as 'Radar', is a technology that has been increasingly used in many vehicular applications, such as in adaptive cruise control, sensor-based applications, etc. A radar system is an electronic system designed to transmit radio signals and receive reflected images of those signals from a 'target' object, in order to determine the bearing and distance to the 'target'. In future, vehicle manufacturers have suggested that vehicle radar systems may additionally be employed in safety related applications, such as: determination of a vehicle starting and/or stopping, to perform pre-cash detection and potentially to instigate emergency braking, etc. One example of radar technology that has been proposed for vehicular applications uses mono-static radar technology arranged to operate in the 77 GHz frequency range.

Transceivers arranged to utilise radar technology require transceiver chips, or separate transmitter and receiver circuits (that may be implemented in discrete component form) to be located in close proximity to one another, to improve the accuracy in determining a distance and bearing to a particular object. As a consequence, and particularly at typical radar frequencies where the transmit (and therefore receive) frequency is very high, such as in the 77 GHz frequency region, it is known that mono-static radar technology suffers from interference caused by sub-optimal isolation between the transmitted and received signals within the transceiver chips (integrated circuits (ICs)) or between the separate transmitter and receiver circuits within the radar transceiver.

FIG. 1 schematically illustrates known causes of interference (transmit leakage) effects in a high frequency transceiver 100. The high frequency transceiver 100 is illustrated with respect to a receiving operation, whereby an antenna 102 receives high frequency signals and passes them to a low noise amplifier 104. Depending on the receiver design and system requirements, the low noise amplifier 104 is optional and can be thus bypassed. The received, and perhaps amplified, high frequency signal 106 is input to a down-converting mixer 108, which down-converts the amplified signal 106 by multiplying it with a local oscillator (LO) signal 112 that is fed from an LO source 110. The output from the down-converting mixer 108 is a desired intermediate frequency (IF) signal 114, which is typically at a very much lower frequency than the operating frequency of the high frequency transceiver 100, such that low-pass or band-pass filtering can be used to remove or attenuate undesired signals in the frequency domain. The IF signal may be a low frequency (LF) signal, a very low IF (VLIF) signal or even a DC (zero IF) signal. As shown, and particularly with high radio frequency (RF) signals, the signals may be undesirably radiated to nearby circuits/elements/transmission lines, etc. Thus, it is known that LO signals and transmit signals may radiate directly onto the receiver path, thereby causing interference to receive signals. This interference is known as cross-talk interference or isolation cross-talk. This phenomenon is sometimes referred to as transmit leakage.

As a consequence, in order to reduce the level of transmit leakage into a receiver path, many radar systems use ultra short transmit pulses to guarantee that the transmitter is shutdown (and therefore the transmitter oscillator signal is highly isolated from antenna) when the echo of the ultra short pulse is expected at the radar receiver. Alternatively, or additionally, radar systems may use spatially-separated antennas for the respective transmit or receive operation, with the spatially-separated antennas arranged to provide high isolation there between. It is also known that radar systems may use high-end circulators to reduce the transmit leakage effects. Each of these designs significantly add to the cost and complexity of the high frequency transceiver.

Isolation to minimise cross-talk may therefore be achieved at high frequencies using high-end circulators or rat-race couplers 150, located between transmit and receive paths. A rat-race coupler 150 would typically provide less than 20 dB isolation between the two paths. Thus, for example, a radar transmit signal of +16 dBm at 77 GHz input to a rat-race coupler exhibiting 20 dB isolation would still leak −4 dBm of transmit signal 152 into the receiver chain. This level of leakage power will be significantly more than the desired receive signal. Hence, a significant portion of the transmitted signal still couples into the receiving channel/circuitry. This undesired transmitted signal acts as an additional, unwanted transmit leakage signal in the receiver down-mixer circuitry, thereby creating an undesired DC offset at the intermediate frequency output. Moreover, this large LO signal at the RF port drives the receiver into compression, thereby degrading the receiver noise figure performance.

High frequency mixer circuits are often based on the known Gilbert cell type. The Gilbert cell type is an active mixer that provides a conversion gain instead of conversion loss. However, the linearity of such active mixers is known to be limited. Thus, in a mono-static radar system, where the signal leakage may easily exceed −4 dBm, the mixer should still be able to operate in a linear mode with such a high leakage level. To achieve this level of linearity, the input referred 1-dB compression point, which is a measure for the linearity of the receiver, must be designed with sufficient margin compared to the maximum input power. As a rule of thumb, the compression point is calculated as: 10 dB plus the maximum power level. Thus, in the above example when the leakage level is −4 dBm, the desired 1-dB compression point is in the region of +6 dBm. Hence, the design of such extremely linear mixer cores requires high supply voltages and extremely high current densities in the transistors. As active Gilbert-cell mixers cannot support this combination of competing system parameters, a trade-off is often made, for example the output power of the transmitter is often reduced to lower the cross-coupled leakage into the receiver path. However, a lower transmitted power will reduce the signal-to-noise ratio (SNR) of the system, which in turn degrades the system performance. To overcome this problem, the cross-coupled signal into the receiver needs to be cancelled using an alternative approach.

Typically, the cancellation of such signals requires a provision of an accurate anti-phase version of the signal to be cancelled. Thus, the phase effects of radio frequency (RF) circuits, such as Gilbert cell mixers, are difficult to be compensated for, as implementing controllable phase shifter technology at such high frequencies is generally and practically unrealizable due to cost, size and/or isolation performance constraints.

DE102007046566A1 and the publication by H. P. Forstner et al. titled "A 77 GHz 4-channel automotive radar transceiver in SiGe", published in IEEE RFIC 2008 both disclose the use of a rat-race coupler in a mono-static radar system. The rat-race coupler increases the loss of the transmit signal and significantly degrades the signal to noise in the receive path. In addition, the feedthrough of the transmit signal into the receive path using the architectures suggested will typically drive the receiver down-mixer into compression.

SUMMARY OF THE INVENTION

The present invention provides an integrated circuit, a transceiver and method for transmit signal (leakage) cancellation in a receiver, as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

FIG. 4 illustrates a flowchart of an example transmit leakage cancellation process employed in a high frequency transceiver.

DETAILED DESCRIPTION

Figure 1:
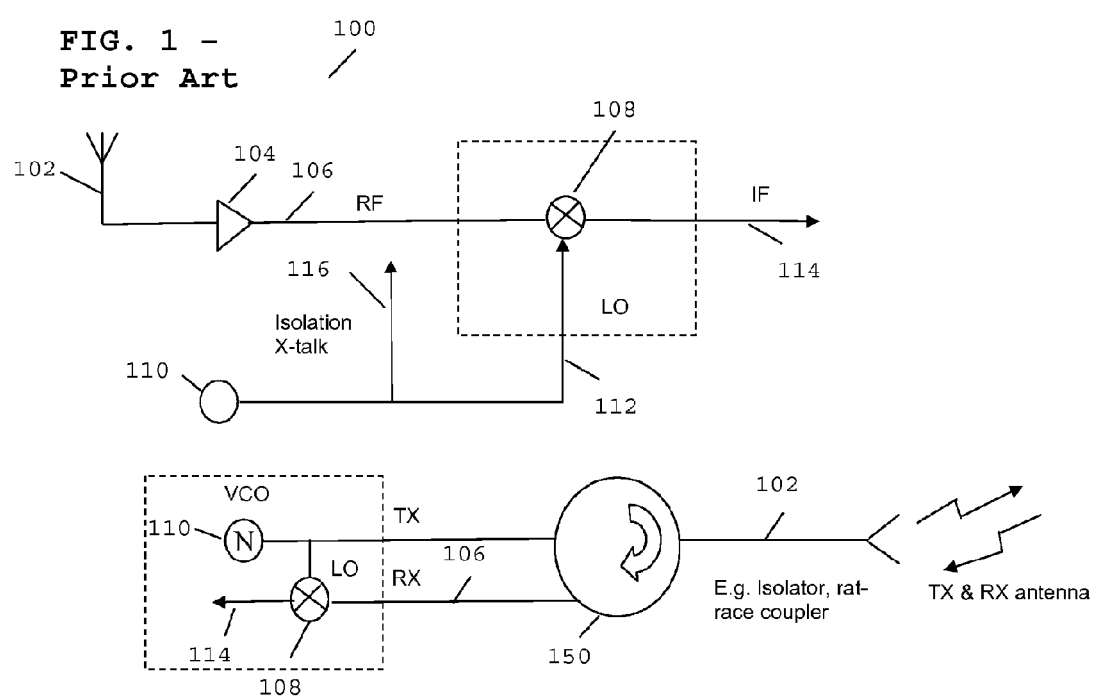
FIG. 1 schematically illustrates known causes of transmit leakage effects in a high frequency transceiver.

Before describing in detail particular examples, it should be observed that the apparatus, components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In one example, a technique is described that improves a performance of, say mono-static radar systems (77 GHz), by use of a dual conversion receiver approach employing a method to electronically adjust a phase shift of a compensating radio frequency (RF) signal in a novel architecture. In one example implementation, the proposed technique may be used to adjust a phase of RF signals in a radar system by using a real-time, feedback arrangement to dynamically and automatically adjust a phase compensation signal. Advantageously this mechanism may provide a way to achieve an improved signal-to-noise ratio (SNR).

In a monostatic radar system the key figure of merit (FoM) is that the RF circuit should be designed to have as high a signal-to-noise ratio performance as possible in the intermediate frequency (IF) domain. Due to the usage of one common antenna for both the transmit (Tx) path and receive (Rx) path, the isolation between the transmitting and receiving path is always limited. In this case a portion of the transmit signal is, thus, fed into the receive path. For example, as the monostatic radar system transmit power is high (typically of the order of +15 dBm) even a transmit/receive isolation performance of 20 dB results in a leakage signal of approximately −5 dBm into the Rx input. As the receiver is required to successfully recover extremely low RF power levels (for example in the range of −70 dBm to −20 dBm), with optimum noise performance, the parasitic transmit signal dominates the receiver performance. Thus, in order to achieve a sufficient noise margin, the linearity of the receiver channel must be extremely high. Hence, in order to obtain an acceptable SNR the parasitic transmit signal in the receive path must be sufficiently cancelled by a signal with opposite phase and equal in amplitude.

Figure 2:
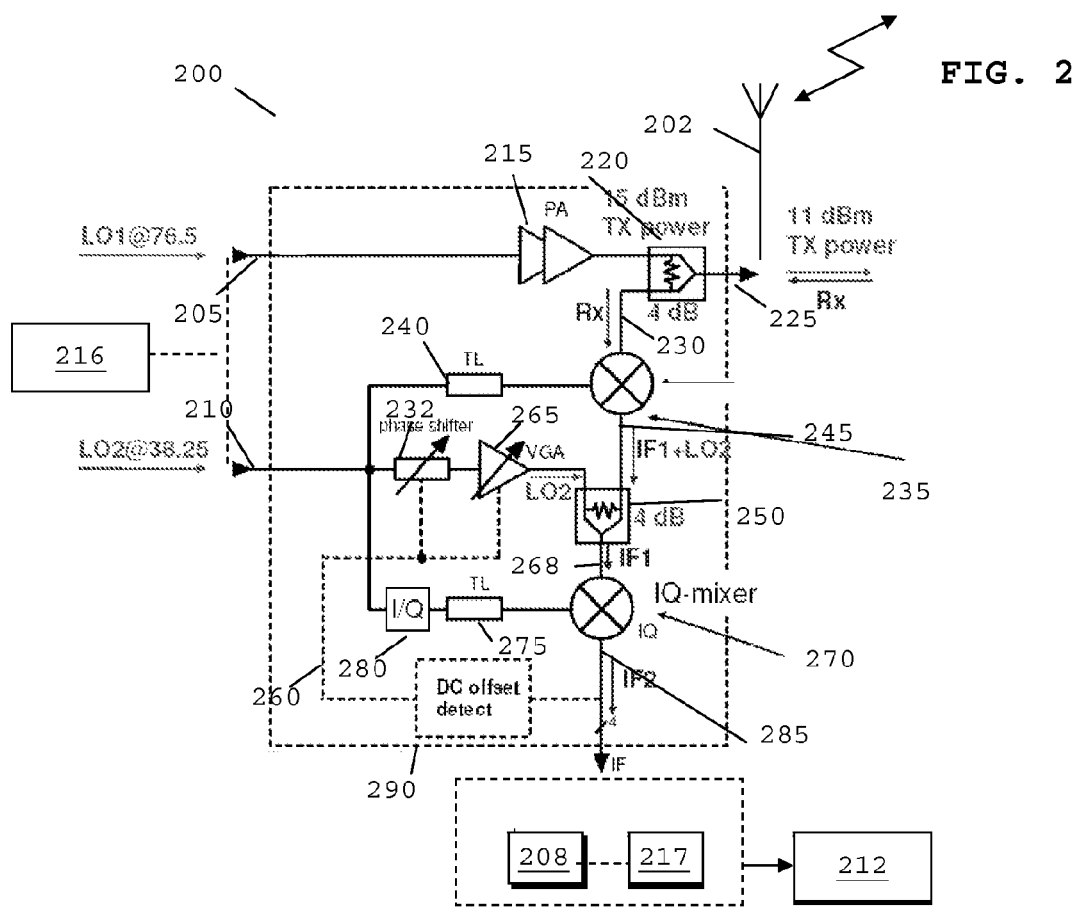
FIG. 2 illustrates a more detailed block diagram of an example of a high frequency transceiver, suitable for a mono-static radar architecture.

Referring now to FIG. 2, a simplified block diagram of an example of a high frequency transceiver architecture that uses an electronically controlled phase shifter to substantially cancel any transmit leakage observed in the receive signal is shown. In practice, purely for the purposes of explaining example implementations of the invention, the high frequency transceiver is described in terms of a mono-static radar transceiver architecture, although the functional elements are recognized as being similar or equivalent to those found in most wireless transceivers. In the subsequent description, the term 'transceiver' encompasses both the unit that performs transmitter and receiver operations (such as a mono-static radar unit or a high frequency communication unit), as well as a discrete-component transceiver circuit or transceiver chipset that is designed to perform the specific high frequency transceiver operations within such a radar or high frequency communication unit. In the example shown, the cancellation is performed after the first down-conversion stage.

The high frequency transceiver architecture 200 comprises an antenna 202, which in this example is operably coupled to a Wilkinson divider 220 that provides isolation between receive and transmit chains within the high frequency transceiver architecture 200. The high frequency transceiver architecture 200 may comprise a frequency generation circuit 216 that may be operably coupled to either or both of the transmitter circuitry and/or the receiver circuitry and arranged to provide local oscillator signals to either, or both. The frequency generation circuit 216 may comprise (or be operably coupled to) a frequency generation source, such as a crystal oscillator (hereinafter referred to as a local oscillator (LO)). In other examples, a transmit signal 205 of the high frequency transceiver architecture 200, which may in some examples be considered as a local oscillator (LO) signal or a radio frequency (RF) pulse operating at 76.5 GHz is input to a power amplifier 215. The output from the power amplifier 215 is input to, say, a first port of a Wilkinson divider 220. Typically, the PA output may in a region of +15 dBm, with, say, a 4 dB insertion loss of the Wilkinson divider 220 leaving an output power of the transmit signal 225, output from a second port of the Wilkinson divider 220, being of the order of +11 dBm, which is input to an antenna (not shown). The transmit parasitic signal appearing at the (receiver) third port of the Wilkinson divider 220, assuming an isolation performance of 20 dB, is −5 dBm, which will be significantly higher than the received signal that is also fed to the third part.

In a receive mode of operation, the received signal is fed from the antenna (not shown) to the second port of the Wilkinson divider 220 and appears at the third port after undergoing a typical insertion loss of 4 dB. Thus, the composite signal 230 that is applied to highly-linear down-mixer 235 comprises a very low level received signal together with the relatively high level transmit parasitic signal. In highly-linear down-mixer 235, composite signal 230 is mixed with a 38.25 GHz local oscillator signal 210, arranged to be half of the operating frequency of 76.5 GHz, and fed via transmission line 240. Thus, the signal 245 that is output from the highly-linear down-mixer 235 comprises the desired received signal at intermediate frequency signal (IF1) and the transmit parasitic signal (LO2), both at a frequency of 38.25 GHz.

Signal 245 is input to a first port of a second Wilkinson divider 250, where it is combined with a phase and amplitude shifted version of the 38.25 GHz local oscillator signal 210 input to a third port of the second Wilkinson divider 250. The signal 268 output from a second port of the second Wilkinson divider 250 is input to a quadrature mixer 270, where it is multiplied with an I-Q version of the 38.25 GHz local oscillator signal 210. The 38.25 GHz local oscillator signal 210 is input to I/Q logic 280, which generates the I/Q LO signals that drive the quadrature mixer 270 via transmission lines 275.

Signal 285 that is output from the I-Q mixer 270 is, thus, at a very low second intermediate frequency (IF2), which in this example is around 0 Hz. Signal 285 is then input to further decoding and demodulation circuitry (not shown) in the mono-static radar architecture. In one example, signal 285 is also input to DC offset detection logic 290, which is arranged to detect any DC offset in the down-converted received signal created due to the leakage into the receive path of the transmit parasitic signal. The DC offset detection logic 290 comprises signal processing logic arranged to determine from the very low second intermediate frequency whether a DC offset exists, and if so, in response thereto, to control via control signal 260 the phase shift applied by phase shifter 232 and gain provided by variable gain amplifier 255. The phase shifter is arranged to generate a 'complementary' LO signal at 38.25 GHz, from the 38.25 GHz local oscillator signal 210 that is input to the phase shifter 232, and the variable gain amplifier (VGA) 265. The operation and function of one example phase shifter circuit, is described later with respect to FIG. 3.

In this manner, the signal LO2∠(+180) generated by the phase shifter is combined with the signal IF1+LO2∠ by the second Wilkinson divider 250. In this way, the transmit parasitic signal LO2 is substantially cancelled and only the desired IF1 signal remains and is applied at the input port of the I/Q mixer 270.

Hence, the use of a feedback arrangement, for example in a form of DC offset detection logic 290 coupled to an electrically adjustable phase shifter and/or a VGA the phase and amplitude of the received signal may be maintained in a range to obtain an acceptable signal-to-noise ratio.

Furthermore, a single-side band Noise Figure (NFssb) of the high frequency transceiver architecture 200 may be improved by an order of >10 dB by selecting the right phase to be applied to the compensating RF signal (namely second LO signal 210).

In other example implementations, other circuit components and configurations may be used that employ the concepts herein described. For example, in one example implementation, a rat-race coupler may be used in contrast to a Wilkinson divider.

In the above examples, the noise performance of the receiver system can be significantly improved, both generally and when the high frequency transceiver is operating in compression. Using such actively controlled compensation techniques, the requirements on the active mixer core can be drastically reduced, thereby resulting in lower total power consumption and significantly improved system signal-to-noise ratio (SNR) performance. Thus, an active real-time feedback system is provided, which will automatically adjust the phase of an RF signal based on the signal-to-noise ratio (SNR) of the down-converted IF signal. Furthermore, the aforementioned examples may be applied to any RF operating frequency, and thereafter any IF or baseband frequency.

For completeness, the receiver circuitry is serially coupled to signal processing logic 208, arranged to process the IF or baseband frequency. An output from the signal processing logic 208 is provided to a suitable output device 212. In a vehicle radar application, examples of the output device 212 may comprise an indication on a vehicle dashboard or electro-mechanical braking equipment to potentially instigate emergency braking, or a separate air-bag controller circuitry when performing pre-cash detection, etc. A controller 217 maintains overall control of the high frequency transceiver 200. The controller 217 is also coupled to the receiver circuitry and the signal processing logic 208 (generally realized by a digital signal processor (DSP)). The controller 217 may also be coupled to a timer arranged to control the timing of operations (transmission or reception of time-dependent signals) within the high frequency transceiver architecture 200.

Clearly, the various components within the high frequency transceiver 200 can be realized in discrete or integrated component form, with an ultimate structure therefore being application-specific or purely a design selection. For example, in this example, the frequency generation circuit 216 and the other transceiver radio frequency circuits may be formed within the same integrated circuit (IC) package. In other examples, the frequency generation circuit 216 and the other transceiver radio frequency circuits may be formed within separate or distinct IC packages or as separate lumped elements or circuits.

Figure 3:
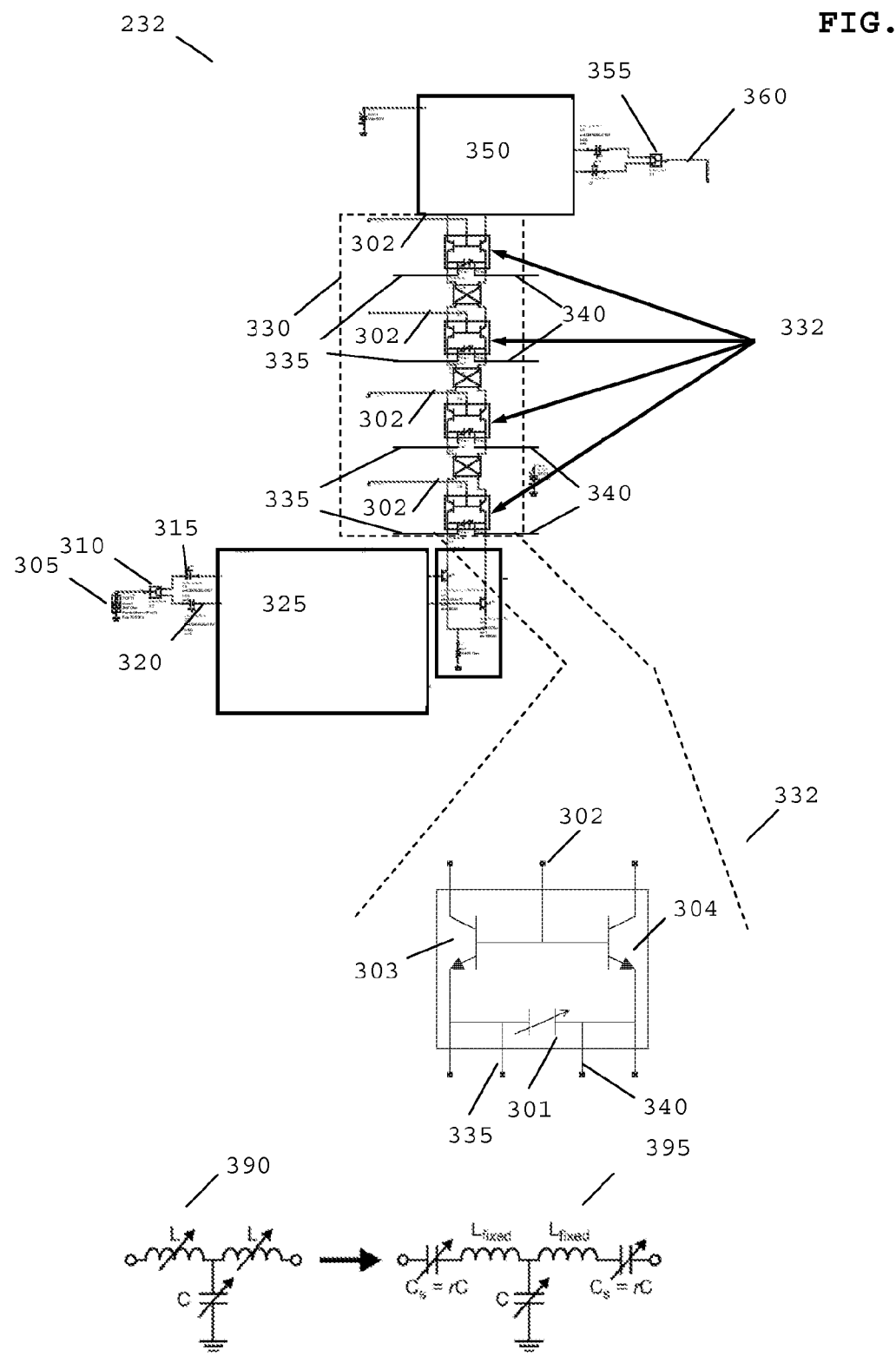
FIG. 3 illustrates an example of an electrically-controlled phase shifter arrangement for use in the high frequency transceiver of FIG. 2.

Referring now to FIG. 3, an example illustration 232 of one possible electrically-controlled phase shifter, which uses a plurality of cascaded phase shift circuits, is shown. In this example, the plurality of phase adjustment circuits may be cascaded such that a total phase shift of a differential RF signal can be adjusted, whilst simultaneously achieving the desired gain and maintaining full stability (by checking the stability of each cascaded circuit) and achieving acceptable component matching. In the example illustration 232, differential input signals 315, 320 are provided by a balun 310 that is fed from a single-ended signal source 305. The differential input signals 315, 320 are provided to an input matching stage 325, for example using known transmission line matching techniques. The output from the input matching stage 325 is input to a differential input stage comprising two transistors. The voltage gain of the circuit is realized by the differential input stage. The output from the two transistors of the differential input stage is input to an electrically adjustable phase shifter block.

The electrically adjustable phase shifter block comprises a plurality of phase shifter circuits 332, which can be cascaded as shown to achieve the required total phase variation from the input to the output. A constant bias signal 302 is applied to each of the active devices of the phase shifter circuits 332. The maximum number of phase shifter circuits 332 that can be cascaded in a phase shifter block 232 is only limited by the total supply voltage of the circuit. The number of phase shifter circuits 332 used in the phase shifter block 232 may be selected based on the active circuit technology used and/or the phase shift that may be required at a particular operating frequency.

The electrically adjustable active phase shifter circuit 332 comprises two active devices 301, 303, which may be in any suitable form, for example bipolar junction transistors (BJTs), hybrid bi-polar transistors (HBTs), conductive metal oxide semiconductor (CMOS) devices, etc., are connected in a differential common base arrangement. The base contacts of the two active devices 301, 303 are connected together via a capacitance to an analogue ground (common base). A voltage bias is applied to the two active devices 301, 303 via a voltage applied through a resistor (not shown). The emitters of both common base transistors are coupled via an electronically controlled variable capacitor 304. Circuits 390, 395 illustrate two example implementations of the electronically controlled variable capacitor 304.

In a typical realization the electronically controlled capacitor 304 is based on a varactor (voltage controlled capacitor). However, in other example implementations, any element that is able to cause a change of effective capacitance and/or inductance may be used, for example switchable capacitors by metal oxide semiconductor field effect transistors (MOSFETs), by MEMS, etc. In some examples, de-coupling of the varactor biasing from the bias points at the emitter of the common base transistors 301, 303 may be realized by lumped capacitors. By applying a voltage to the bias ports, the effective capacitance between the emitter contacts of the common base transistors may be controlled and dynamically adjusted. By varying the effective capacitance, the phase shift between the emitter contacts will also be varied, which will further change the absolute phase of the phase shift circuit.

Each of the phase shifter circuits 332 are controlled using analog control voltages P_Var_p 340 and P_Var_n 335 to adjust the effective capacitance of a varactor. The analog control voltages for each of the stages are connected together, where the difference between these two voltages is defined as control/varactor voltage (VVar):

$$VVar = P\_Var\_p - P\_Var\_m \quad [1]$$

In this manner, different levels of VVar correspond to different phase shifts, with typically higher VVar voltages corresponding to higher phase shifts The differential output from the phase shifter block 232 is provided to an output matching circuit 350, for example implemented using known transmission line matching techniques. The matched differential output from the output matching circuit 350 is combined by a balun 355 and output to a 50 Ohm load 360.

In one example, the phase shift provided by a single phase shifter circuit 332 or a cascade of phase shifter blocks 232 may be adjusted by either an analogue or even digital control signal, for example using signal processing logic (not shown) to receive and process suitable input signals and output appropriate control voltages Var_p and Var_m. For example, an internal analog control signal VVar may be generated from a digital signal provided by the signal processing logic by a digital-to-analog (D/A) converter on chip.

In another example, an alternative electrically controlled phase shifter circuit may be employed, for example as described in the paper titled "A 77 GHz phased-array transceiver with on-chip antennas in silicon: transmitter and local LO-path phase shifting", published in the IEEE Journal of Solid State circuits, Vol. 41, No 12, December 2006.

Referring now to FIG. 4, a flowchart 400 illustrates an example transmit leakage cancellation process employed in a high frequency transceiver that is suitable for a mono-static radar application. The transmit leakage cancellation process adjusts a phase of a frequency-dependent signal by electrically adjusting a phase and/or amplitude of a frequency-dependent signal. The subsequent combining of the electrically phase-adjustable signal with a composite signal that comprises the transmit leakage signal, facilitates transmit leakage cancellation by the example architecture of FIG. 2.

The example flowchart of FIG. 4 is described with respect to an operation in a mono-static radar transceiver, where transmit signals and receive signals operate at the same frequency (Fo).

After commencing in step 405, for example due to turn 'on' of the high frequency transceiver, a transmit signal and a receive signal are both input to, say a high frequency coupler device, such as a Wilkinson Divider, to form a composite signal, as shown in step 410. The composite leakage (transmit and receive) signal is then input to a radio frequency Gilbert cell mixer, where it is mixed with a local oscillator signal operating at, say at Fo/2, as shown in step 415. The output from the mixer is a second composite signal at a first down-converted frequency, in this case also Fo/2. The first down-converted signal is then combined with a second version of the LO signal in a second coupler stage, such as a second Wilkinson Divider, as shown in step 420.

Notably, the second version of the LO signal has been routed through an electrically adjustable phase shifter and/or variable gain amplifier stage, for example as shown in FIG. 3. Thus, the second version of the LO signal may have been phase shifted and/or amplified compared with the first version of the LO signal that produced the down-converted signal in step 415. The output of the second coupler stage, which includes a phase and/or amplitude adjustment of the LO signal, together with the first composite signal comprising the leakage transmit and desired receive signals, forms a second composite signal. The second composite signal is input to a second mixer. The second mixer also receives a LO signal at the down-converted frequency, which in this example is Fo/2. Thus, the output from the second mixer is a frequency signal at, say, a very low frequency or a zero intermediate frequency (ZIF) in this example, as shown in step 425.

The ZIF output, is then processed to determine whether a dc offset exists, and in one example whether a detected dc offset exists below a threshold level, as shown in step 430. If a dc offset does not exist, or is below a threshold in step 430, the phase shifter setting and amplitude setting on the VGA may remain, as the transmit signal has been sufficiently cancelled out. Thus, no phase or amplitude shift is required, and radar operation is continued using the phase and amplifier stages as previously set.

However, if a dc offset does exist, and is determined as not being below a threshold in step 430, a determination is made as to how much the phase shifter and/or amplitude setting on the VGA needs to be adjusted to bring the dc offset within the threshold, as shown in step 440. It may be assumed here that the transmit signal has not been sufficiently cancelled out by the introduction of the phase and/or amplitude adjusted LO signal in the second coupler. Thus, the determined phase shift and/or gain adjustment is applied to the phase shifter and/or VGA, such that the transmit signal is cancelled out.

The process loops back to step 410 to determine whether the DC offset of the leakage transmit signal, following down-conversion of the transmit signal, may now be determined as being below the threshold for subsequent transmission/reception of high frequency signals.

It will be understood that the examples of a high frequency transceiver, integrated circuit and method for transmit leakage cancellation using an electrically adjustable phase-shift of a high frequency signal in a high frequency transceiver, as described above, may enable a transceiver to improve transmit leakage cancellation of the signals routed therein. In addition, the examples may improve a noise figure performance of the receiver system, for example when used in a mono-static radar system. Furthermore, the examples may provide an active feedback system that may adjust the phase automatically, based on the DC Offset of the IF signal. Moreover, the examples may support a transmit leakage cancellation implementation that is fully digitally controlled.

Those skilled in the art will realize that the above recognized advantages and other advantages described herein are merely exemplary and that the invention does not require all of these advantages to be obtained.

It will be appreciated that the examples described herein may be comprised of one or more generic or specialized processors (or 'signal processors') such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for performing power control described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a 'signal processor' for purposes of the foregoing discussion and claim language.

Moreover, an embodiment of the invention can be implemented as a computer-readable storage element having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the invention have been described. However, one of ordinary skill in the art appreciates that various modifications and changes can be made without departing from the scope of the invention as set forth in the claims below.

Accordingly, the specification and figures are to be regarded in an illustrative rather than a restrictive sense, and all such modifications are intended to be included within the scope of invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims, including any amendments made during the prosecution of this application and all equivalents of those claims as issued.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Moreover in this document, relational terms such as first and second, top and bottom, and the like may be used solely to distinguish one entity or action from another entity or action without necessarily requiring or implying any actual such relationship or order between such entities or actions.

The terms 'comprises', 'comprising', 'has', 'having', 'includes', 'including', 'contains', 'containing' or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by 'comprises . . . a', 'has . . . a', 'includes . . . a', 'contains . . . a' does not, without more constraints, preclude the existence of additional identical elements in the process, method, article, or apparatus that comprises, has, includes, contains the element. The terms 'a' and 'an' are defined as one or more, unless explicitly stated otherwise herein.

The terms 'substantially', 'essentially', 'approximately', 'about' or any other version thereof, are defined as being close to as understood by one of ordinary skill in the art. The term 'coupled' as used herein is defined as connected, although not necessarily directly and not necessarily mechanically. A device or structure that is 'configured' in a certain way is configured in at least that way, but may also be configured in ways that are not listed.

The invention claimed is:

1. An integrated circuit for cancelling a radio frequency transmit leakage signal, wherein the integrated circuit comprises:
   a transmitter portion comprising at least one amplifier stage for transmitting a radio frequency signal to an antenna port; and
   a first coupler arranged to operably couple the transmitter portion, the antenna port and a receiver portion;
   wherein the receiver portion is arranged to receive a first composite signal that comprises a received radio frequency signal from the antenna port and a transmit leakage signal and the receiver portion comprises:
      a first down-conversion circuit arranged to receive the first composite signal and a local oscillator signal such that the first down-conversion circuit outputs a down-converted composite signal at a first intermediate frequency signal; and
      a second coupler arranged to receive the down-converted first composite signal at the first intermediate frequency signal and a phase shifted version of the local oscillator signal such that the phase shifted version of the local oscillator signal is arranged to cancel at least a portion of the transmit leakage signal from the down-converted first composite signal.

2. The integrated circuit of claim 1 further comprising a second down-conversion circuit arranged to receive a transmit leakage cancelled signal from the second coupler and further version of the local oscillator signal and output a second down-converted signal.

3. The integrated circuit of claim 2 further comprising processing logic arranged to receive and process the second down-converted signal and determine a phase of the transmit leakage signal.

4. The integrated circuit of claim 3 wherein the processing logic comprises DC offset determination logic arranged to detect a direct current offset in the second down-converted signal and compare the detected DC offset with a threshold and apply an electrical adjustment signal based on the comparison.

5. The integrated circuit of claim 3 further comprising at least one phase shifter circuit wherein the processing logic is arranged to provide a phase compensation signal to the phase shifter to cancel at least a portion of the transmit leakage signal from the down-converted first composite signal in the second coupler.

6. The integrated circuit of claim 3 further comprising a variable gain element, such that the processing logic is arranged to provide an amplitude compensation signal to the variable gain element to cancel at least a portion of the transmit leakage signal from the down-converted first composite signal in the second coupler.

7. The integrated circuit of claim 5 wherein the at least one phase shifter comprises:
   at least one input for receiving a radio frequency signal,
   a voltage variable element; and
   a plurality of active devices operably coupled to the voltage variable element and arranged to receive a variable control voltage,
   wherein the plurality of active devices comprise at least two active devices coupled in a common base arrangement and arranged to receive the radio frequency signal with the voltage variable element coupling the emitter contacts or source contacts of the at least two active devices such that a variable control voltage applied to the voltage variable element adjusts a phase of the radio frequency signal.

8. A transceiver comprises:
   a transmitter portion comprising at least one amplifier stage for transmitting a radio frequency signal to an antenna port; and
   a first coupler arranged to operably couple the transmitter portion, the antenna port and a receiver portion;
   wherein the receiver portion is arranged to receive a first composite signal that comprises a received radio frequency signal from the antenna port and a transmit leakage signal and the receiver portion comprises:
      a first down-conversion circuit arranged to receive the first composite signal and a local oscillator signal such that the first down-conversion circuit outputs a down-converted composite signal at a first intermediate frequency signal; and
      a second coupler arranged to receive the down-converted first composite signal at the first intermediate frequency signal and a phase shifted version of the local oscillator signal such that the phase shifted version of the local oscillator signal is arranged to cancel at least a portion of the transmit leakage signal from the down-converted first composite signal.

9. The transceiver of claim 8 wherein the transceiver supports transmit signals and receive signals operating on the same radio frequency.

10. The transceiver of claim 8 adapted to operate in a mono-static radar system.

11. A method for cancelling a transmit leakage signal in a transceiver comprising a transmitter portion, a receiver portion and an antenna port, the method comprising:
   receiving, in the receiver portion, a first composite signal that comprises a received radio frequency signal from the antenna port and a transmit leakage signal from the transmitter portion;
   first down-converting the first composite signal using a local oscillator signal to produce a down-converted first composite signal at a first intermediate frequency signal;
   generating a phase shifted version of the local oscillator signal; and
   combining the phase shifted version of the local oscillator signal with the down-converted first composite signal, such that the phase shifted version of the local oscillator signal is arranged to cancel at least a portion of the transmit leakage signal from the down-converted first composite signal.

12. The method of claim 11 further comprising outputting a second down-converted signal from a second down-conversion circuit based on a transmit leakage cancelled signal from a second coupler and a version of the local oscillator signal.

13. The method of claim 12 further comprising determining a phase of the transmit leakage signal based on the second down-converted signal.

14. The method of claim 13 further comprising detecting a direct current offset in the second down-converted signal and comparing the detected DC offset with a threshold and applying an electrical adjustment signal based on the comparison.

15. The integrated circuit of claim 13 further comprising providing a phase compensation signal to the phase shifter to cancel at least a portion of the transmit leakage signal from the down-converted first composite signal in the second coupler.

16. The method of claim 13 further comprising providing an amplitude compensation signal to a variable gain element to cancel at least a portion of the transmit leakage signal from the down-converted first composite signal in the second coupler.

17. The method of claim 15 further comprising:
   applying a variable control voltage applied to the voltage variable element to adjust a phase of the radio frequency signal.

* * * * *